July 26, 1955  W. R. HENCKE ET AL  2,714,168
RADIOACTIVITY FLOW METER
Filed Dec. 29, 1951
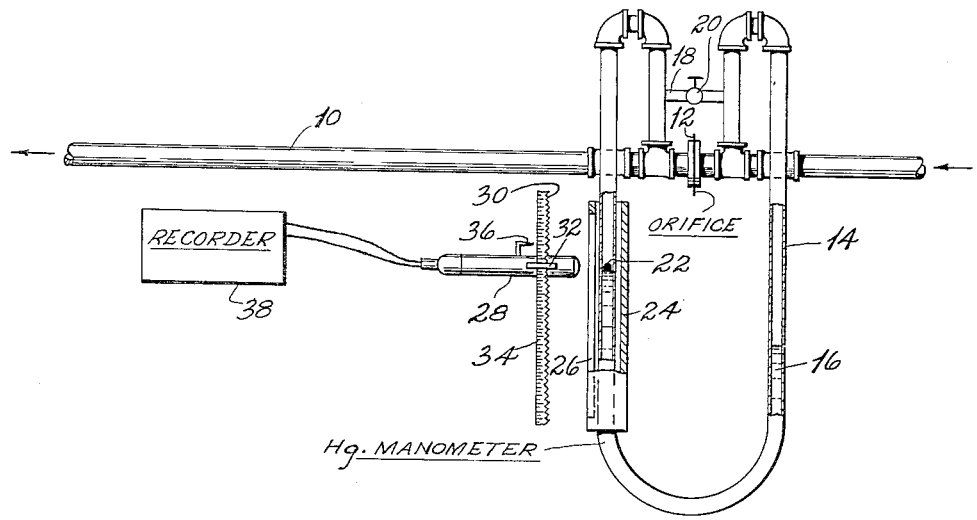
INVENTORS
WILLIAM R. HENCKE
EDWARD L. COLE
BY
ATTORNEYS

United States Patent Office 2,714,168
Patented July 26, 1955

2,714,168

RADIOACTIVITY FLOW METER

William R. Hencke, Old Tappan, N. J., and Edward L. Cole, Glenham, N. Y., assignors to The Texas Company, New York, N. Y., a corporation of Delaware Application December 29, 1951, Serial No. 264,116

2 Claims. (Cl. 250—43.5)

This invention relates to a method and an apparatus for measuring the rate of flow of a fluid and more particularly to a method and a device of this type for measuring the rate of flow through a conduit of a gaseous fluid under high pressure and temperature. The principal object of the invention resides in the provision of means whereby the flow of gas through a metal conduit or pipe can be measured without having direct access to the gas itself and without the use of pressure gauges or any glass equipment.

It is not uncommon that in certain industrial operations it is necessary to determine the rate of flow of a fluid through a conduit when the fluid is under pressure of several thousand pounds per square inch. As an example, in various hydrogenation systems hydrogen containing gas is recycled under pressures as high as five thousand pounds per square inch or even higher and at temperatures sometimes exceeding 1500° F. Rotameters have been found unsuitable for this purpose because of lack of accuracy and manometers of steel or other metal which will withstand these pressures are not generally available. Although these devices may be obtainable in glass, this material is, of course, a very real source of danger at these pressures.

In accordance with the invention a differential manometer of steel tubing is connected to the conduit carrying the gas at opposite sides of an orifice plate. The manometer contains a body of a fluid such as mercury and due to the differential pressure at the opposite sides of the orifice, the mercury will rise in the low pressure leg of the manometer, the height of the mercury column in that leg serving as an indication of the rate of flow of the gas through the conduit. In order to determine the height of the mercury column in the manometer leg a small source of a radioactive material such as a small pellet of radioactive cobalt is floated on the mercury and a radiation detector such as a Geiger-Mueller counter is arranged to be moved up and down close to the leg of the manometer. When the response of the detector is the maximum, the operator will know that the detector is horizontally opposite the source of radioactivity and a notation can be made of the height of the detector at this point.

For a better understanding of the invention, reference may be had to the accompanying drawing in which the single figure is a vertical elevation of an apparatus embodying the invention, certain parts being broken away to show the interior thereof.

Referring to the drawing a pipe or conduit 10 is adapted to conduct a gaseous medium, the rate of flow of which is to be measured. Disposed in the conduit 10 is an orifice plate 12, the size of the orifice of which will be chosen in accordance with the anticipated range of the flow rates of the gas. Connected to the conduit 10 at the opposite sides of the orifice plate 12 is a U shaped manometer tube 14, which may be, for example a 9/16 inch O. D. stainless steel pressure tube. Within the manometer tube 14 is a body of a liquid 16 such as mercury and as is well understood, the height of the mercury column in the two legs of the manometer will vary with the rate of flow of gas through the conduit 10, this being due to the differential pressures existing at opposite sides of the orifice plate 12. Connected across the upper portions of the manometer legs is a by-pass 18 containing a suitable valve 20 which is normally closed but which can be opened in the event the orifice in the plate 12 should become clogged, to prevent having to shut down the units. The valve can also be adjusted, for example at the beginning of operations to provide a desired zero setting for the manometer.

Assuming that the gas, the rate of flow of which is to be measured is under high pressure the manometer tube 14 will be formed preferably of a metal such as stainless steel as has been stated hereinbefore. Even if a glass window were provided in some manner in the one leg of the manometer tube, this would obviously be a potential source of danger and in accordance with the invention means are provided for determining the height of the liquid column without the necessity for actually seeing the liquid. To this end a small source of radioactivity 22 such for example, as a pellet of radioactive cobalt is floated upon the mercury 16 in the low pressure leg of the manometer and a tubular shield 24 of a metal such as steel or lead is preferably disposed around that portion of the manometer tube in which measurements are to be taken. The shield 24 is provided with a slot 26 along one vertical side. Facing and in fairly close proximity to the slot 26 is a radiation detector which may comprise a conventional Geiger-Mueller counter 28. The counter 28 may also be encased in a suitable radiation shield of lead or the like with the exception of the end of the counter facing the slot 26. This end of the counter may, if desired, be provided with a small horizontal window or slit not shown. The detector 28 may be moved manually, vertically along the manometer leg and since, with a lead shield the device may be quite heavy, it is preferred to provide some means for raising and lowering the detector or at least for holding the detector in a horizontal position after it has been moved. Shown in the drawing is a vertical rod 30 having threads or serrations along one side to be engaged by suitable latch means 32 affixed to the side of the detector 28. Another side of the rod 30 is preferably provided with a scale or indicia 34 which may for example, be marked off in millimeters and which is adapted to so operate with a suitable pointer 36 on the detector 28. If desired, the rod 30 may be completely threaded throughout its length to engage with similar threads in the latch device or ear 32 so that by turning the rod the detector will be moved up and down along the manometer tube. The output of the detector 28 is conducted to a suitable amplifier and meter or recorder 38.

It is believed that the operation of the apparatus will be clear from the foregoing description, however, to summarize, the conduit 10 may convey any gaseous medium such as the high pressure and high temperature gas being recycled from the pumps to a preheater in a hydrorefining unit. With no flow through the conduit the level of the mercury 16 will, of course, be the same in both legs of the manometer. With a certain rate of flow through the conduit 10, the mercury column and the radioactive source 22 will assume a certain level or height in the low pressure side of the manometer and by moving the detector 28 in a vertical direction a point will be found at which the detector response is indicated as a maximum at the meter or recorder 38, the detector then being directly opposite the source 22. The height of the detector at that time can be read from the scale 34 and recorded if desired.

In case the temperature of the gaseous medium flowing through the conduit 10 should change materially the mercury 16 may of course expand and it may be necessary to establish a new zero point. If desired, a second radiation detector can be disposed along the high pressure leg of the manometer and a radioactive source also floated on the mercury column in that leg. In this manner readings can be taken substantially simultaneously, of the heights of the mercury columns in the two legs of the manometer and in this manner, the rate of flow through the conduit 10 may be found, regardless of temperature changes in the mercury. Again, the single detector 28 may be used manually to determine the heights of the mercury columns, first in one and then the other of the manometer legs.

It will be seen that a method and an apparatus has been provided whereby the rate of flow of a fluid through a conduit can be measured without the manometer liquid actually being visible to the operator, even when the pressures and temperatures of the gaseous medium are extremely high.

It is contemplated that if desired, the radiation detector or counter tube can be placed in substantial vertical alignment with the low pressure leg of the manometer tube and fixed in that position. The movement of the radiation source toward or away from the detector will cause an increase or decrease respectively of the radiation intensity at the director and a device recording the detector output will indicate the height of the top of the liquid level in that leg and thus the rate of flow through the conduit 10 at any time. It is also contemplated that the output of the detector may be used to control the position of a valve or other device to regulate the flow through the conduit 10 or to give a warning or the like when the liquid level reaches a predetermined height in the manometer tube. Any suitable electrical relay system or other means can be used for this purpose.

Obviously many modifications and variations of the invention as hereinbefore set forth may be made without departing from the spirit and scope thereof.

We claim:

1. An apparatus for measuring the rate of flow through a conduit of recycle gas in a high pressure hydrogenation system, comprising an orifice plate disposed in said conduit in the path of said fluid, a manometer formed of metal tubing connected to said conduit at opposite sides of said orifice, said manometer containing a body of liquid, a radioactive source adapted to float upon said liquid in one leg of said manometer, radiation detecting means adapted to be moved vertically adjacent and in parallel to said manometer leg, a layer of radiation shielding material substantially encasing said manometer and having a vertical slit facing toward said detecting means, a maximum output of said detecting means indicating the vertical position of said source and thus the rate of flow of said gas through said conduit.

2. In a hydrogenation process the method of measuring the rate of flow of recycle hydrogen-containing gas through a conduit opaque to visible light which comprises varying the height of a liquid column in accordance with variations in said flow, floating a source of radioactivity on the liquid in said column and locating the vertical position of said source by moving a radiation responsive means along said liquid column, a maximum response in radiation intensity indicating that said means is horizontally opposite the top of said liquid.

References Cited in the file of this patent

UNITED STATES PATENTS

| | | |
|---|---|---|
| 2,376,459 | Stevens | May 22, 1945 |
| 2,456,233 | Wolf | Dec. 14, 1948 |